(12) United States Patent
Stookey et al.

(10) Patent No.: US 6,180,168 B1
(45) Date of Patent: Jan. 30, 2001

(54) PROCESS FOR THE MANUFACTURE OF A MEMBRANE DEVICE WITH INTERNAL SWEEP

(75) Inventors: Donald Joseph Stookey, Creve Coeur; Paul William Kramer, Ellisville, both of MO (US)

(73) Assignee: Air Products and Chemicals, Inc., Allentown, PA (US)

( * ) Notice: Under 35 U.S.C. 154(b), the term of this patent shall be extended for 0 days.

(21) Appl. No.: 09/240,994

(22) Filed: Feb. 1, 1999

(51) Int. Cl.[7] ........................................................ B05D 1/18
(52) U.S. Cl. ........................ 427/235; 427/245; 427/430.1; 427/443.2
(58) Field of Search ................................... 427/235, 244, 427/430.1, 439, 238, 245, 387, 393.5, 393.6, 443.2

(56) References Cited

U.S. PATENT DOCUMENTS

| | | | |
|---|---|---|---|
| 4,230,463 | * 10/1980 | Henis et al. ........................... 55/16 |
| 4,687,578 | 8/1987 | Stookey ............................ 210/321.1 |
| 5,169,412 | 12/1992 | Prasad et al. ............................ 55/16 |
| 5,205,842 | 4/1993 | Prasad ..................................... 55/16 |
| 5,215,554 | * 6/1993 | Kramer et al. ........................... 55/16 |
| 5,259,869 | 11/1993 | Auvil et al. .............................. 95/52 |
| 5,411,662 | 5/1995 | Nicolas, Jr. et al. ............. 210/321.8 |
| 5,500,036 | 3/1996 | Kalthod ................................... 95/54 |
| 5,525,143 | 6/1996 | Morgan et al. .......................... 95/52 |
| 6,001,425 | * 12/1999 | Stash et al. ....................... 427/430.1 |

FOREIGN PATENT DOCUMENTS

0702995A1   10/1992   (EP) ............................. B01D/53/22

* cited by examiner

Primary Examiner—Shrive Beck
Assistant Examiner—Kirsten A. Crockford
(74) Attorney, Agent, or Firm—Mark L. Rodgers

(57) ABSTRACT

An internally swept membrane separation device is manufactured by applying a coating layer to an otherwise non-selective membrane in a controlled manner. A coating material is introduced into one end of a vertically positioned membrane separation device to flood the device to a controlled depth, thereby coating a predetermined portion of the non-selective membrane.

19 Claims, 1 Drawing Sheet

PROCESS FOR THE MANUFACTURE OF A MEMBRANE DEVICE WITH INTERNAL SWEEP

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to the manufacture of a hollow fiber membrane module having internal sweep generation.

Modules containing hollow fiber membranes have been employed in a wide variety of fluid separation applications. A fluid mixture is brought into contact with one side of the hollow fiber membranes with a pressure differential being maintained across the membrane, whereby the permeable fluid component permeates to the other side of the membrane under a partial pressure gradient. In order to maintain this partial pressure differential across the membrane, a sweep fluid is often employed to help remove the permeating fluid. This is especially important in applications where only small amounts of fluid are to be separated from the fluid mixture, such as in dehydration applications.

U.S. Pat. No. 5,169,412 discloses an integrated system including an air separation membrane system and a membrane dryer. In this system, waste or recycle streams from the air separation membrane are used as purge in the membrane dryer. U.S. Pat. No. 5,205,842 discloses a two-step membrane dryer having a first or "roughing" stage and a second or "polishing" stage. The second stage employs a portion of the dried product gas as a reflux purge to sweep the permeate side of the membrane. European patent application EP 0 702 995 A1 discloses a process and apparatus for separating components of a gas stream, including removing water vapor; i.e., drying, which includes bringing a feed gas into contact with a semi-permeable membrane and maintaining a shallow vacuum on the permeate side of the membrane. Either dry product gas or an external purge stream can be used as the permeate sweep.

U.S. Pat. No. 5,259,869 discloses a process for removing water vapor from a gas stream, wherein a portion of dried product gas is reduced in pressure and returned to the permeate side of the membrane to act as a sweep gas. The dried sweep gas is then captured along with the permeate gas and recycled to the feed system so that none of the dried product gas is lost.

U.S. Pat. No. 4,687,578 discloses a fluid separation module utilizing at least two membrane sections, a sweep generation section and a drying section. Membrane area is minimized and the sweep is generated internally by creating a region where the membrane possesses higher transport flux, preferably near the dry product end, to create a countercurrent flow pattern with respect to the feed. One method used to create the sweep zone is to provide for an uncoated portion of the membrane so as to increase the local membrane flux.

U.S. Pat. No. 5,411,662 discloses a hollow fiber membrane fluid separation device. Tubesheets are provided to encapsulate both ends of the hollow fiber membrane bundle and to separate the feed/non-permeate side from the purge/permeate side of the membrane bundle. At least one of the tubesheets is secured so that the sweep fluid port is in fluid communication with the permeate side of the hollow fiber membrane bundle.

U.S. Pat. No. 5,500,036 describes a process and apparatus for providing an oxygen enriched gas stream. A hollow fiber membrane module is provided wherein one or more of the hollow fibers are shortened so that the feed gas entering those hollow fibers flows onto the permeate side of the fibers in the module thereby providing countercurrent sweep to the permeate side of the hollow fibers. U.S. Pat. No. 5,525,143 discloses a method and apparatus for the dehydration of gases utilizing hollow fiber membranes. The hollow fiber membranes are positioned in a shell and extend from a first tubesheet near the feed gas inlet to a second tubesheet near the product outlet, with each end of the hollow fiber terminating in and penetrating a tubesheet. The second tubesheet has at least one aperture to allow non-permeate gas to return to the permeate side of the fibers to provide a countercurrent sweep.

BRIEF SUMMARY OF THE INVENTION

An internally swept membrane separation device is manufactured by application of a coating layer to an otherwise non-selective membrane in a controlled manner. Coating is applied to one end, typically the feed end, of a membrane within a vertically positioned membrane separation device by flooding the device to a controlled depth with the membrane coating or sealing solution. Furthermore, in this invention the depth (height) of the coating solution is automatically adjusted to insure a consistent, controlled amount of sweep will be produced when the device is completed and put to use. Gas pressure is applied across the membrane device while the device is being filled with the coating solution. The depth [height] of the coating solution is automatically controlled by filling the device until a prescribed gas flux is measured, at which time the filling is stopped, thereby leaving the sweep generation portion of the device untouched by coating solution. The manufacturing process is completed by curing the applied coating layer on the separating section of the dryer.

DETAILED DESCRIPTION OF THE INVENTION

Figure 1:
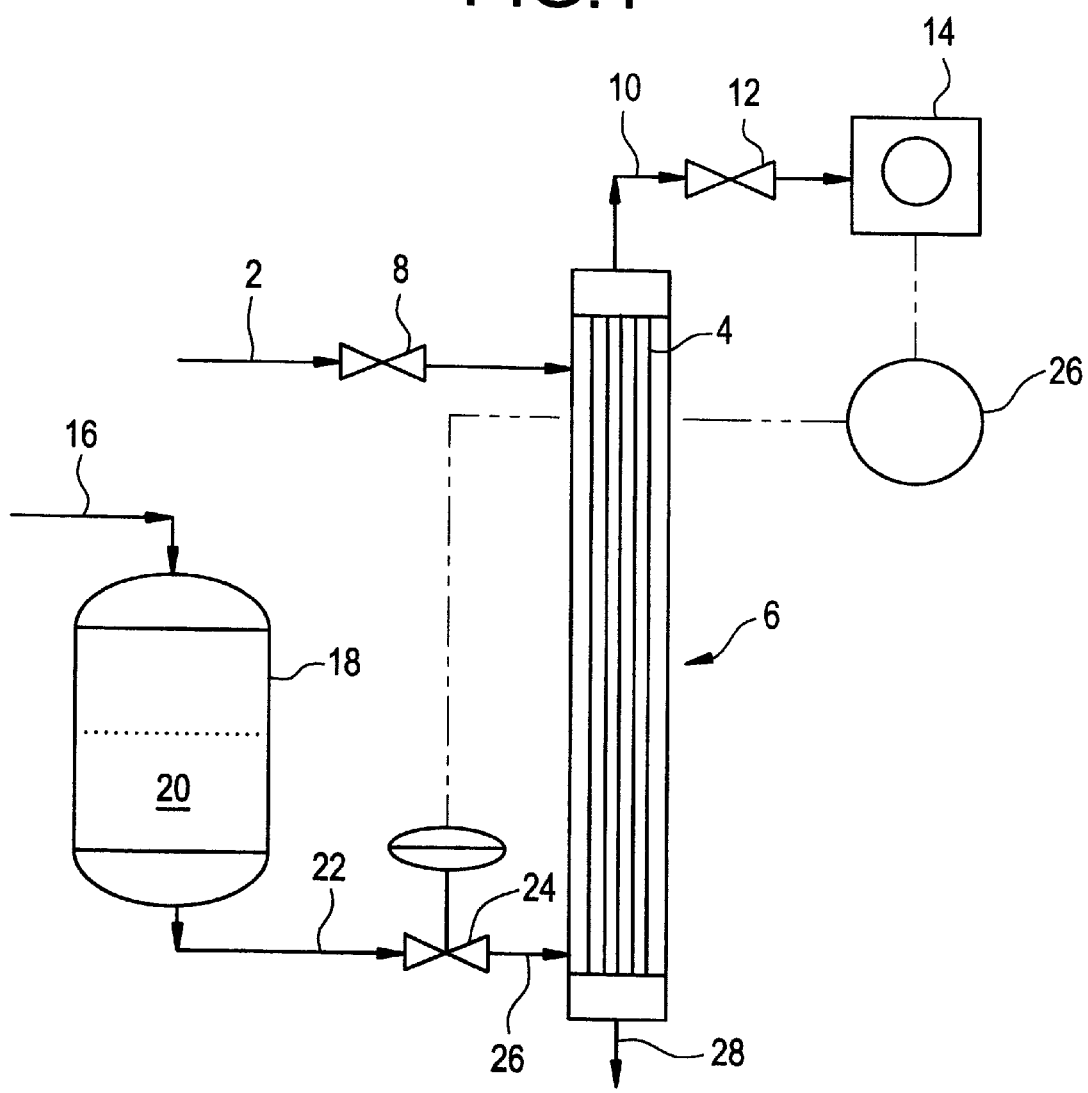
FIG. 1 is a diagram of an apparatus used in carrying out the process of the present invention.

Typical membrane separation devices for which the present invention is well suited are comprised of an elongated shell, having a feed gas inlet, and a non-permeate outlet at substantially opposite ends of the shell, and a permeate outlet appropriately located. The shell contains hollow fiber membranes positioned so as to extend from a first tube sheet near the feed gas inlet to a second tube sheet near the non-permeate outlet, each end of the hollow fibers terminating in and penetrating a tube sheet. The feed gas contacts the hollow fiber membranes at the feed gas inlet. The feed gas initially contacts either the bores of the fibers (bore side feed) or the exterior of the fibers (shell side feed). Depending upon the type of membrane and coating material, one or more components of the feed gas selectively permeate the hollow fibers thereby separating the components of the feed gas. As discussed above in the prior art, many such membrane separation devices provide for a sweep gas to be applied to the permeate side of the membrane to increase the driving force of the permeate through the membrane.

The present invention is a membrane separation device having an internal sweep and a method of manufacturing such membrane device having at least two zones along the membrane flow path that have substantially different membrane fluxes and selectivities. This is accomplished by applying a coating to only a portion of a membrane, such as an asymmetrical hollow fiber bundle. This partial coating is accomplished by controlling the depth (i.e., height) of the coating solution during the manufacturing process. The amount of fiber coated; i.e., depth of coating solution is calculated based upon the properties of the hollow fibers used. The asymmetric hollow fibers used in this invention should have sufficient surface porosity or permeation flux such that adequate sweep flux can be provided by the uncoated sweep generation section of the membrane device.

A wide variety of permeable hollow fibers can be used in this invention, including fibers made from organic polymers as well as fibers made from inorganic materials, such as ceramic or carbon, fibers. Examples of suitable organic fibers include polysulfone, derivatives of polysulfone, polyimides, derivatives of polyimides, polyamidimides, and the like. The critical parameter is that the type of hollow fiber chosen be compatible with the selected coating solution and also exhibit sufficient permeability characteristics to provide adequate sweep volume. The specific coating solution used is dependent upon the type of separation which the separation device is to be used for as well as being compatible with the fiber material. Examples of coating materials include silicon rubbers, water permeable polymers, cellulosics, poly(vinyl alcohol) (PVOH), chitosans, polyacrylonitrile (PAN), and the like. The coating material may optionally be applied to either the shell side (i.e., outside) or the bore side of the hollow fiber. Depending upon the specific coating material used and the particular application, the coating may optionally be cured by undergoing a curing step after it is applied to the substrate.

Membranes made by the present process are especially useful in applications where the component which is to be separated from the fluid feed stream has a high flux through the membrane compared to the other components present in the feed. Examples include the manufacture of membrane dryers which are used for removing water vapor from gas streams, such as air and natural gas.

While hollow fiber membranes are best suited for most applications for which these membrane separators are used; i.e., especially dehydration applications, this manufacturing process can also be used for other types of membranes, such as spiral wound, parallel plate, or flat sheet membranes.

The present process is advantageous in that it provides for membrane separation devices having uniform and predictable sweep gas rates despite variations in the hollow fiber bundles. Additionally, the resultant separators have a controlled and predetermined amount of sweep.

The present invention can best be understood by referring to FIG. 1. The flux of nitrogen through the uncoated membrane is determined by passing a low pressure nitrogen stream 2 through the hollow fiber bundle 4 positioned in the separation device 6. The flow of low pressure nitrogen 2 is controlled by valve 8. The nitrogen passing through the hollow fiber bundle exits the separation device 6 as stream 10, regulated by valve 12 and measured in flow meter 14.

The measurement obtained from the flow meter 14 can then be applied to an algorithm which determines the appropriate amount of coating solution to be applied to the fiber bundle 4 to meet the product target sweep rate. To apply the coating solution, high pressure nitrogen 16 is introduced into a vessel 18 containing the desired coating solution 20. The high pressure nitrogen 16 forces the coating solution 20 out of the vessel 18 via conduit 22. The flow of coating material is controlled by valve 24, which is regulated by a flow control switch 26. The flow control switch 26 is programmed to regulate the flow of coating material based upon the flow of nitrogen measured in the flow meter 14. The coating material enters the separation device 6 through conduit 26 and fills the separation device 6 to a predetermined point based upon the calculated required sweep. Accordingly, a predetermined portion of the hollow fiber bundle 4 is coated with the coating material, while another portion of the bundle remains uncoated. Excess coating material is then removed from the separation device 6 via conduit 28, optionally with the aid of a vacuum.

In carrying out the present process, the coating material can be applied after, or preferably simultaneously, with the measurement of nitrogen in the flow meter and accompanying calculation of coating material volume.

While separation devices having countercurrent flow are generally preferred, co-current and possibly cross-flow, arrangements could also be produced by similar processing techniques. By selectively coating first one, and then the other end of the fiber bundle in accordance with the above procedure, a sweep zone could be designed for the center or other sections along the length of the bundle.

EXAMPLE 1

Several membrane separation devices were fabricated in accordance with the present invention to demonstrate the effect that varying coating levels have on separator performance. The separation devices contained polyimide hollow fiber membrane bundles and were dip coated on the shell side of the fibers using coating solution comprised of 1 weight percent Sylgard® (silicon rubber available commercially from Dow Corning) in isopentane. Three separation devices first characterized by feeding wet air to the bores of the hollow fibers and noting permeate flow and product dew point depression. Each was subsequently dip coated while in a vertical position by partially filling the shell with the Sylgard solution. After the coating was cured, each device was characterized by testing with wet air. Each device was successively coated and tested after application of 1,000 cc, 1,200 cc, and 1,600 cc of the Sylgard solution to the shell side. The amount of purge reported as a fraction of feed was measured and correlated with the change in dewpoint depression. The results are reported in Table 1 below and clearly demonstrate that the manufacturing method of the present invention allows for the control of purge flow and dewpoint depression by adjusting the volume of coating solution used. This precise control cannot be obtained using prior art internal sweep designs.

TABLE 1

Feed Pressure ~ 100 psig

| Module # | Module Size = 3 × 3 Coating Comments | Feed Flow | NP Flow | Permeate Flow | Purge (fraction of feed) | Feed DP (° F.) | NP DP (° F.) | DP (° F.) |
|---|---|---|---|---|---|---|---|---|
| | | [scfm (60° F., 1 atm)] | | | | | | |
| 1 | uncoated | 45.8 | 34.3 | 11.4 | 0.250 | 51.4 | 21.6 | 29.9 |
| 2 | uncoated | 45.1 | 33.8 | 11.3 | 0.250 | 51.3 | 21.9 | 29.3 |
| 3 | uncoated | 46.1 | 34.6 | 11.5 | 0.250 | 46.9 | 14.0 | 32.9 |
| 1 | 1000 cc-Sylgard | 30.1 | 22.5 | 7.5 | 0.250 | 56.3 | −16.4 | 72.7 |
| 1 | 1000 cc-Sylgard | 45.3 | 38.7 | 6.7 | 0.147 | 57.0 | 24.1 | 32.9 |
| 2 | 1000 cc-Sylgard | 27.8 | 20.9 | 6.9 | 0.249 | 57.9 | −14.1 | 72.0 |
| 2 | 1000 cc-Sylgard | 42.5 | 36.2 | 6.3 | 0.148 | 57.6 | 23.5 | 34.0 |
| 3 | 1000 cc-Sylgard | 28.7 | 21.5 | 7.2 | 0.250 | 57.9 | −13.4 | 71.3 |
| 3 | 1000 cc-Sylgard | 43.1 | 36.7 | 6.4 | 0.149 | 57.2 | 23.5 | 33.7 |
| 1 | 1200 cc-Sylgard | 24.7 | 18.5 | 6.2 | 0.250 | 71.2 | −15.9 | 87.1 |
| 1 | 1200 cc-Sylgard | 24.7 | 18.5 | 6.2 | 0.252 | 57.4 | −24.5 | 81.9 |
| 1 | 1200 cc-Sylgard | 39.2 | 33.3 | 6.0 | 0.152 | 55.8 | 18.1 | 37.6 |
| 2 | 1200 cc-Sylgard | 23.9 | 18.0 | 5.9 | 0.248 | 68.9 | −20.6 | 89.5 |
| 2 | 1200 cc-Sylgard | 24.2 | 18.1 | 6.1 | 0.251 | 56.3 | −27.4 | 83.7 |
| 2 | 1200 cc-Sylgard | 38.0 | 32.3 | 5.7 | 0.150 | 57.9 | 18.3 | 39.6 |
| 3 | 1200 cc-Sylgard | 25.2 | 18.9 | 6.3 | 0.250 | 57.2 | −23.1 | 80.3 |
| 3 | 1200 cc-Sylgard | 39.5 | 33.6 | 5.9 | 0.150 | 57.4 | 19.8 | 37.6 |
| 1 | 1600 cc-Sylgard | 16.5 | 12.4 | 4.1 | 0.249 | 56.8 | −49.9 | 106.7 |
| 1 | 1600 cc-Sylgard | 27.8 | 23.6 | 4.2 | 0.151 | 57.6 | 11.7 | 45.9 |
| 2 | 1600 cc-Sylgard | 16.5 | 12.4 | 4.1 | 0.248 | 57.2 | −50.1 | 107.3 |
| 2 | 1600 cc-Sylgard | 27.4 | 23.3 | 4.1 | 0.149 | 57.4 | 12.4 | 45.0 |
| 3 | 1600 cc-Sylgard | 14.0 | 9.7 | 4.3 | 0.308 | 57.7 | −75.6 | 133.4 |
| 3 | 1600 cc-Sylgard | 17.4 | 13.1 | 4.3 | 0.249 | 57.0 | −49.7 | 106.7 |
| 3 | 1600 cc-Sylgard | 21.2 | 16.9 | 4.3 | 0.201 | 57.2 | −17.7 | 74.9 |
| 3 | 1600 cc-Sylgard | 28.5 | 24.3 | 4.2 | 0.147 | 57.7 | 13.8 | 43.9 |

EXAMPLE 2

Several separation devices were manufactured with apparatus as described in FIG. 1 Each separation device contained an axially oriented bundle of hollow fibers assembled in a cylindrical shell and having tubesheets cast of epoxy to seal the fibers to the shell on each end of the device. Each device was mounted vertically in the coating apparatus. Nitrogen was applied to the top of the shell side of the hollow fiber bundle at a controlled pressure of 20 psig. Nitrogen permeating through the hollow fibers under the applied pressure was vented through a port connected to the bore side of the uppermost tubesheet. The nitrogen flow leaving the device was measured with a flow meter to characterize the hollow fiber permeability. Coating solution was then fed to the bottom of the shell side while the nitrogen flow was continuously monitored. When the nitrogen flow reached a predetermined rate, flow of the coating solution was stopped and the solution was drained from the shell. Residual isopentane was evaporated from the device by purging with nitrogen fed to the uppermost shell port and exhausting alternately via the lower shell port and the port communicating with the bore side of the uppermost tubesheet. The Sylgard® coating thus applied was allowed to cure overnight. The devices were then characterized for dehydration by testing with 100 degree F., 100 psig. water saturated compressed air. Results are shown in Table 2.

TABLE 2

| | Coating Conditions | | | Dehydration Test Results | | |
|---|---|---|---|---|---|---|
| Module # | Uncoated Permeability (GPU) | Nitrogen Flow Target Setpoint, scfm | Final Nitrogen Flow, scfm | Permeate Flow, scfm | Dry Product Flow, scfm | Product Dewpoint Depression, deg. F. |
| A | 47.0 | 0.326 | 0.359 | 2.64 | 6.28 | 142.6 |
| B | 81.2 | 0.326 | 0.332 | 2.76 | 6.20 | 140.0 |
| C | 38.2 | 0.326 | 0.348 | 2.74 | 6.12 | 146.4 |
| D | 62.2 | 0.326 | 0.344 | 2.76 | 6.22 | 146.0 |

GPU = 1.0E − 6 cc (STP)/sqcm-sec-cmHg
Dewpoint Depression = Feed Dewpoint − Product Dewpoint

What is claimed is:

1. A method of manufacturing a membrane separation device having a predetermined sweep gas rate, which separation device comprises one or more membranes positioned axially within an elongated shell, said shell having a feed inlet, a permeate outlet, and a non-permeate outlet, said method comprising vertically positioning said separation device and passing a gas stream through the membrane while measuring the rate of flow of said gas through the membrane, and flooding the separation device to a controlled depth with a coating solution to coat a portion of the membranes positioned within said separation device to achieve a predetermined gas flow rate through the membranes, and subsequently removing excess coating solution from the separation device, to obtain said predetermined sweep gas rate.

2. A method in accordance with claim 1 wherein said membranes are in the form of a bundle of hollow fibers.

3. A method in accordance with claim 2 wherein said coating solution is contacted with the outside of said hollow fiber membranes.

4. A method in accordance with claim 2 wherein said coating solution is contacted with the bores of the hollow fiber.

5. A method in accordance with claim 1 wherein said coated membrane undergoes a curing step after the excess coating solution is removed.

6. A method in accordance with claim 1 wherein said membrane is formed from an organic polymer.

7. A method in accordance with claim 6 wherein said organic material is selected from the group consisting of polysulfones, derivatives of polysulfone, polyimides, derivatives of polyimides, and polyamidimides.

8. A method in accordance with claim 1 wherein said membrane is formed from an inorganic material.

9. A method in accordance with claim 8 wherein said inorganic material is ceramic or carbon.

10. A method in accordance with claim 1 wherein said coating solution is selected from the group consisting of silicon rubber, water permeable polymers, cellulosics, poly (vinyl alcohol), chitosans, and polyacrylonitrile.

11. A method in accordance with claim 1 wherein said membrane separation device is designed to remove water vapor from a feed stream.

12. A method in accordance with claim 11 wherein said feed stream contains natural gas and water vapor.

13. A method in accordance with claim 11 wherein said feed stream is air.

14. A method in accordance with claim 1 wherein said coating material is introduced into the membrane separation device through the feed inlet.

15. A method in accordance with claim 3 wherein said excess coating material is removed from the membrane separation device through the permeate outlet.

16. A method in accordance with claim 15 wherein a vacuum is applied to the feed inlet to aid in the removal of said excess coating material.

17. A method in accordance with claim 1 wherein said separation device is flooded with a coating material while said gas stream is being passed through the membranes.

18. A method in accordance with claim 1 wherein said separation device is flooded with a coating material after the gas stream has been passed through the membranes.

19. A method in accordance with claim 1 wherein the gas stream which is passed through the membrane is nitrogen.

* * * * *